July 3, 1928.  1,676,024
A. L. HANSEN
FILTER UNIT AND METHOD OF MAKING SAME
Filed July 28, 1926  2 Sheets-Sheet 1
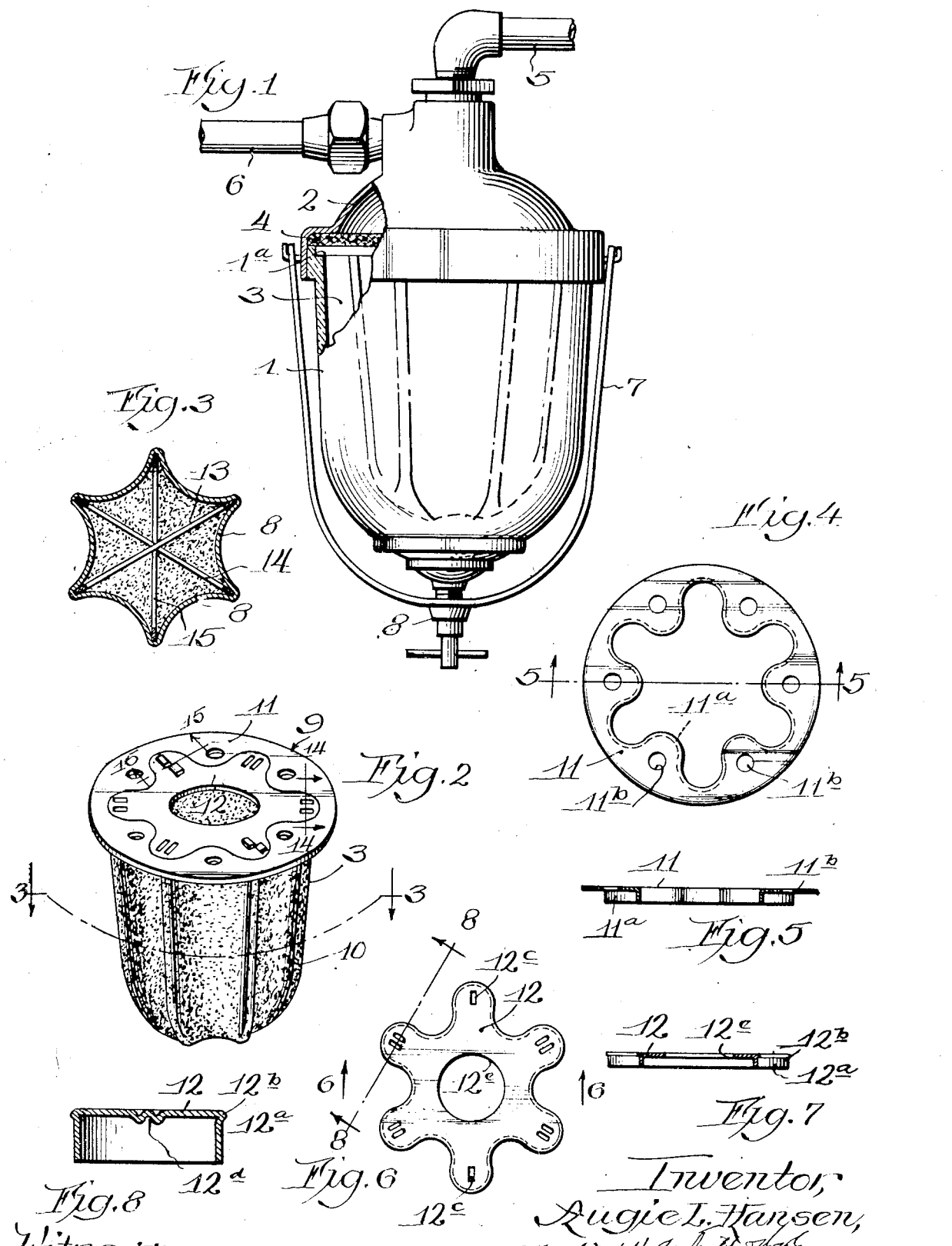

July 3, 1928.
A. L. HANSEN
FILTER UNIT AND METHOD OF MAKING SAME
Filed July 28, 1926    2 Sheets-Sheet 2
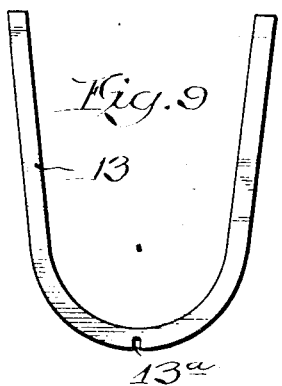
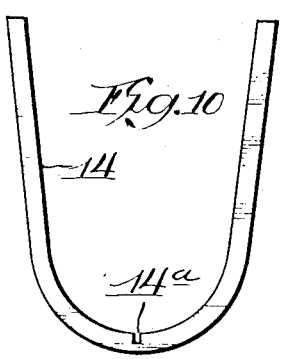
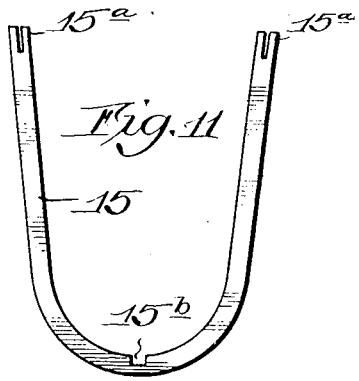
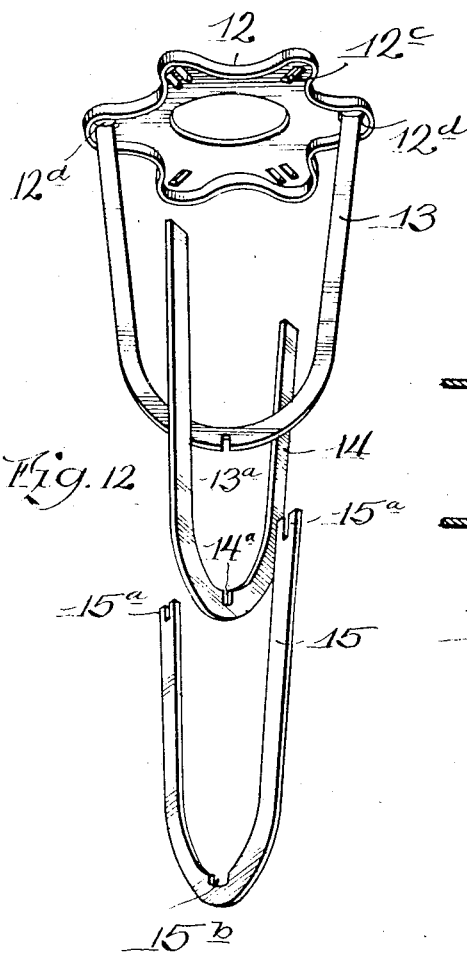
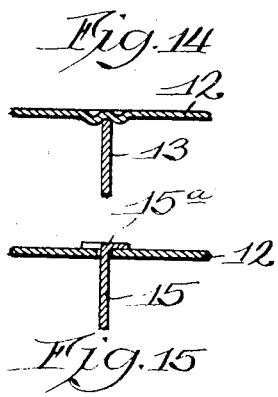
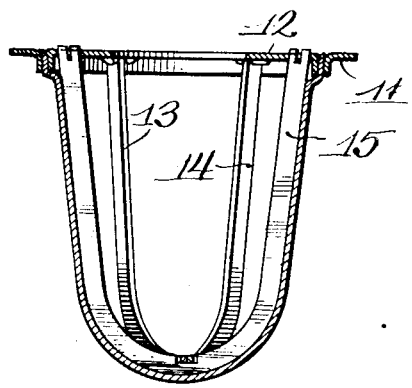

Patented July 3, 1928.

1,676,024

UNITED STATES PATENT OFFICE.

AUGIE L. HANSEN, OF CHICAGO, ILLINOIS, ASSIGNOR TO HERBERT S. STRAUSSER, OF CHICAGO, ILLINOIS.

FILTER UNIT AND METHOD OF MAKING SAME.

Application filed July 28, 1926. Serial No. 125,361.

This invention relates to improvements in filter units, and to an improved method of constructing and assembling the parts of a filter unit.

The term "filter unit" as herein used, applies more particularly to that part of a filter which embodies the screen of filtering material, and supports it in permanent shape so that it can be removed and replaced within the filter receptacle as an independent and self-sustaining element.

The type of filter to which the present disclosure relates, is one designed for the filtering of gasoline and as an assembly for the fuel supply system of an automobile, although the novel features herein disclosed may be used to equal advantage in other filters as well as other devices.

The object of the invention is to provide a novel assembly for a filtering unit, with a view to decreasing the cost of maunfacture, and to otherwise simplify the problem of production.

In the accompanying drawings,

Figure 1 is a view in elevation of a filter of the type utilizing a unit of the present invention.

Figure 2 is a perspective view of the filter unit removed.

Figure 3 is a view in cross-section taken on line 3—3 of Figure 2.

Figure 4 is a top plan view of the outer base member of the unit.

Figure 5 is a cross-sectional view of the outer base member taken on line 5—5 of Figure 4.

Figure 6 is a top plan view of the inner base member of the unit.

Figure 7 is a cross-sectional view of the inner base member as taken on line 7—7 of Figure 6.

Figure 8 is an enlarged detail view in section as taken on line 8—8 of Figure 6.

Figures 9, 10 and 11 are views in elevation of the three U-shaped frame members.

Figure 12 is a perspective view illustrating the manner in which frame members and inner base member are assembled.

Figure 13 is a view in vertical section through the parts of the filter unit, when assembled.

Figures 14 and 15 are enlarged detail views showing the manner in which the ends of the frame members are secured to the inner base member when the unit is assembled, as taken on lines 14—14 and 15—15 of Figure 2, respectively.

The filter illustrated in Figure 1, comprises a glass receptacle 1, open at its top and closed by a metal cap 2. Within the receptacle is a filtering unit 3, seating at its upper margin in a shoulder 1ª around the top of the receptacle and bearing against a washer 4 between the edge of the receptacle and the cap. Inlet and outlet pipes 5 and 6 have connection with the receptacle through the cap, there being passages arranged for conducting the liquid into the receptacle and thence through the filtering material to the discharge pipe. The receptacle and cap are held together by a U-strap 7 secured to the edge of the cap and extending around the receptacle with a threaded stem 8 bearing against the bottom thereof.

As shown in Figure 2, the filtering unit comprises a circular base member 9 at its upper end and a depending body portion of a generally conical shape, which as shown in Figure 3, consists of a sheet 10 of relatively pliable filtering material, such as chamois, stretched over a skeleton frame, made up of members later to be described.

Referring now to the construction of the filter units, the base member 9 is a two-part disc consisting of an outer ring 11 and an inner ring or plate 12, both stamped from sheet metal of relatively thin gauge, the metal being preferably brass, although any other suitable metal may be used.

The outer ring 11 is circular about its periphery, or outer edge, and its inner edge or internal margin is formed in a series of regular convolutions of alternate reversed lobes with a continuous flange 11ª of about ⅛ inch in width extending throughout the convolutions. Between the outwardly extending lobes and spaced equidistantly about the ring, is a plurality of holes 11ᵇ.

The inner ring 12 has its outer edge or periphery fluted and flanged to conform exactly with the inner edge of the outer ring 11, so that the two parts may be fitted together with a press fit. The outer flanged edge 12ª of the ring 12 preferably has a small bead or lip 12ᵇ at the junction of the ring and flange, as shown in Figure 8. At the center of the inner ring, is a circular hole 12ᶜ which, in the assembled unit has seating engagement with a stem through which the liquid is conducted to or from the interior of the filter unit. The inner ring, which resembles a six-pointed star, with rounded lobes or points, is further provided with a series of slots or lugs at the ends of these points, as follows: In the end portions of each of one pair of oppositely disposed points is a radial slot $12^c$. At corresponding positions in the remaining points are pairs of depressed lugs extending radially and forming on the under side of the ring, downwardly facing notches or recesses $12^d$, as clearly shown in Figure 8. The purpose of the slots and lugs will be presently disclosed.

The skeleton frame of the unit is made up of three U-shaped frame members 13, 14 and 15 as shown in Figures 9, 10 and 11, respectively. These members, are preferably flat bars bent edgewise with their end portions slightly divergent. Frame members 13 and 14 are duplicates of each other, differing only in the location of notches which are cut in the lower portions thereof. Thus member 13 has a narrow notch $13^a$ cut in its lower edge and facing downwardly, whereas member 14 has a similar notch $14^a$ in the corresponding position in its upper edge. The depth of these notches is substantially one-half the width of the bars and the width equal to their thickness. The third frame member 15 differs from the two in that its branches are slightly longer and their extremities are slotted lengthwise for a short distance as at $15^a$, $15^a$. Moreover, the notch $15^b$ at its lower end is twice as wide as the other notches, although it faces upwardly as in the frame member 14.

Figure 12 illustrates the manner of uniting the frame members 13, 14 and 15 and the inner ring 12, this being the first step in the assembling operation. Holding the ring 12 stationary in a suitable support, a frame member 13 is applied against the under side of the ring with its ends fitting in one pair of notches $12^d$ in the manner shown in Figure 14. Then a frame member 14 is applied with its ends in the other pair of notches $12^d$ and with its notch $14^a$ interlocking with the notch $13^a$ of the first frame member 13. In this position, the planes of the two members 13 and 14 are displaced through an angle of 60°. Finally, the frame member 15 is applied, by inserting its slotted ends $15^a$ through the slots $12^c$ with its notch $15^b$ straddling the lower portions of the interlocked frames 13 and 14. Thus by bending over the portions of the slotted ends $15^a$ which projects through the slots $12^c$ after the manner shown in Figure 15, the frame members are rigidly fixed to the inner ring 12.

The next step in the assembling process is the application of the filtering medium over the skeleton frame and applying the outer ring 11. This may be accomplished either by hand or a punch press operation in somewhat the following manner: A circular piece of the material, chamois, for instance, is laid over the outer ring and concentric therewith and then the assembled frame and inner ring 12 is passed through the outer ring, until the inner ring is pressed home into its seat within the outer ring, the two complementary flanges $11^a$ and $12^a$ interfitting with the margins of the filtering material tightly held between them. In this manner, the material is drawn taut giving it the fluted appearance when completed. If there is any excess material beyond the rings, this can be trimmed off flush with the plane of the top faces of the rings. The flanges having some degree of resiliency, are distorted by the wedging of the material between the edges of the rings, thus producing a frictional interlocking of the parts together as a rigid unit without the use of other locking or fastening members.

Manifestly the same method may be employed in assembling other articles of manufacture as well as filtering units, the principal advantage of which is the utilization of friction to secure the edges of a relatively pliable material to a disc, leaving a sufficient margin beyond the material to provide a flange for supporting the complete unit within its seat in the receptacle.

Moreover, the same method may be employed where a relatively stiff filtering material is used, such as wire mesh, which would ordinarily not require a frame to support it. Thus the frame members could be readily eliminated and the edges secured between interfitting rings as herein set forth, and which may have circular flanged edges or any other conformation desired.

For these reasons, I do not intend to limit the invention to the specific disclosure herein made.

I claim as my invention:

1. An article of manufacture for the purpose described, comprising a disc consisting of a ring and a circular plate having interfitting flanged edges, a skeleton frame member depending from said disc, and a covering of pliable material extending over said frame and having its marginal portion frictionally secured between the flanged edges of said ring and plate.

2. An article of manufacture for the purpose described, comprising a disc consisting of an outer ring and an inner plate having complementary flanged edges, skeleton frame members secured at their ends to said inner plate, and a covering of pliable material stretched over said frame and its margins frictionally secured between the flanged edges of said ring and plate.

3. An article of manufacture for the purpose described, comprising a two-part disc consisting of an outer ring and an inner ring having interfitting marginal flanges, skeleton frame members having interlocking connection with said inner ring, and a screen of relatively pliable filtering material fitting over said frame and having its edges secured between the flanged edges of said outer and inner discs.

4. An article of manufacture for the purpose described, comprising a two-part disc consisting of an outer ring and an inner ring having interfitting marginal flanges, a frame consisting of a plurality of U-shaped bars having interlocking connection at their lower ends and rigid connection with said inner ring at their free ends, and a covering of pliable material over said frame having its free edges secured between the flanged edges of said rings.

5. A method of constructing a rigid filtering unit including a screen of relatively pliable material consisting of providing a two-part disc adapted to be joined along internal and external flanged edges, securing skeleton frame members in abutting engagement with one part of said disc, applying the pliable material over said frame, and pressing said disc parts together with the marginal portions of said screen therebetween.

6. A method of constructing a rigid frame structure including walls of a relatively pliable material consisting of providing a rigid skeleton frame having a flanged margin extending around said frame, applying a piece of the pliable material over said frame and against said flanged margins, passing said frame through a ring having internal margins conforming to the flanged margins of said frame, and pressing said ring and frame together.

7. A method of constructing a rigid frame structure including walls of a relatively pliable material consisting of providing a two-part disc divided along complementary flanged edges, securing a skeleton frame consisting of a plurality of U-shaped frame members to the inner member of said disc, applying a piece of pliable material over said frame to enclose the flanged edges of said inner member of the disc, and passing the covered frame through the outer member of the disc and pressing the same together into interfitting engagement.

8. A method of constructing a rigid frame structure including walls of a relatively pliable material consisting of providing a two-part disc divided along complementary flanged edges, providing a frame consisting of U-shaped bars, assembling said frame members into skeleton frame and connecting the same to the inner member of said disc by inserting the ends of one bar through slots in said member, and bending the ends over on the opposite side thereof, applying a piece of pliable material over said frame to enclose the flanged edges of said inner member of the disc, and passing the covered frame through the outer member of the disc until said members are brought into interfitting engagement.

Signed at Chicago, Ill., this 22nd day of July, 1926.

AUGIE L. HANSEN.